United States Patent
Lee

(10) Patent No.: US 10,745,621 B2
(45) Date of Patent: Aug. 18, 2020

(54) LIQUID CRYSTAL POLYMER COMPOSITE AND HIGH-FREQUENCY COMPOSITE SUBSTRATE

(71) Applicant: AZOTEK CO., LTD., Taoyuan (TW)

(72) Inventor: Hung-Jung Lee, Taoyuan (TW)

(73) Assignee: AZOTEK CO., LTD., Taoyuan (TW)

( * ) Notice: Subject to any disclaimer, the term of this patent is extended or adjusted under 35 U.S.C. 154(b) by 9 days.

(21) Appl. No.: 15/970,857

(22) Filed: May 3, 2018

(65) Prior Publication Data

US 2019/0078022 A1    Mar. 14, 2019

(30) Foreign Application Priority Data

Sep. 14, 2017   (TW) .............................. 106131631 A

(51) Int. Cl.
| | | |
|---|---|---|
| C09K 19/38 | (2006.01) | |
| C09K 19/54 | (2006.01) | |
| C09K 19/52 | (2006.01) | |

(52) U.S. Cl.
CPC .......... *C09K 19/3809* (2013.01); *C09K 19/52* (2013.01); *C09K 19/54* (2013.01); *C09K 19/542* (2013.01); *C09K 2019/521* (2013.01); *C09K 2019/523* (2013.01); *C09K 2019/525* (2013.01); *C09K 2219/11* (2013.01)

(58) Field of Classification Search
None
See application file for complete search history.

(56) References Cited

U.S. PATENT DOCUMENTS

| | | | | |
|---|---|---|---|---|
| 5,719,354 A | * | 2/1998 | Jester ................... | H05K 3/4617 174/255 |
| 2009/0111949 A1 | * | 4/2009 | Cho ....................... | C08G 73/18 525/417 |
| 2010/0326696 A1 | * | 12/2010 | Mahapatra ............. | H01B 3/445 174/110 SR |
| 2012/0125673 A1 | * | 5/2012 | Kondo ................... | C09D 167/03 174/258 |
| 2014/0231123 A1 | * | 8/2014 | Onodera ................ | H05K 1/032 174/255 |
| 2015/0259589 A1 | * | 9/2015 | Takagi .................... | C08K 3/04 428/480 |

FOREIGN PATENT DOCUMENTS

| | | |
|---|---|---|
| JP | 2004-315678 A | 11/2004 |
| JP | 2006-8976 A | 1/2006 |
| JP | 2006-299153 A | 11/2006 |

(Continued)

OTHER PUBLICATIONS

Dutta & Weiss—LCP blends & composite laminates—Poly.Comp.—1992 (Year: 1992).*

(Continued)

*Primary Examiner* — Callie E Shosho
*Assistant Examiner* — John Vincent Lawler
(74) *Attorney, Agent, or Firm* — CKC & Partners Co., LLC

(57) ABSTRACT

A liquid crystal polymer composite is disclosed herein. The liquid crystal polymer composite includes a solvent, a soluble liquid crystal polymer, and an additive. The soluble liquid crystal polymer is dissolved in the solvent. The additive includes an organic polymer or inorganic filler, while the additive is dispersed or dissolved in the solvent.

8 Claims, 1 Drawing Sheet

(56) References Cited

FOREIGN PATENT DOCUMENTS

| | | | | |
|---|---|---|---|---|
| JP | 2008-37982 A | | 2/2008 | |
| JP | 2008037982 | * | 2/2008 | ............. B32B 27/36 |
| JP | 2011-32316 A | | 2/2011 | |
| KR | 10-2016-0002401 A | | 1/2016 | |
| TW | 201132247 A1 | | 9/2011 | |

OTHER PUBLICATIONS

Okamoto—Solution-cast LCP films—Polymer—2005—1-s2.0-S0032386105006609-main (Year: 2005).*
Obinata—JP 2008-037982 A—MT—JP SR D#2—liquid crystal polyester w-maleimide groups—2008 (Year: 2008).*
Mukherjee—PC-LCP-Kevlar blends—improved dyn.mech.—2009 (Year: 2009).*
Sinh—AIN+LCP ester amide—soluble in pyrrolidone—Poly.Comp.—2012 (Year: 2012).*
Kevlar_Technical_Guide_0319 (Year: 2017).*
Aluminum Oxide _Al2O3 Material Properties (Year: 2019).*
Liquid Crystal Polymer (LCP)-Plastics Materials Introduction (Year: 2019).*
Poly(p-phenylene terephthalamide)_C14H14N2O4—PubChem (Year: 2019).*
Okamoto—Newly developed LCP film fabricated by solvent-casting—2005 (Year: 2005).*

* cited by examiner

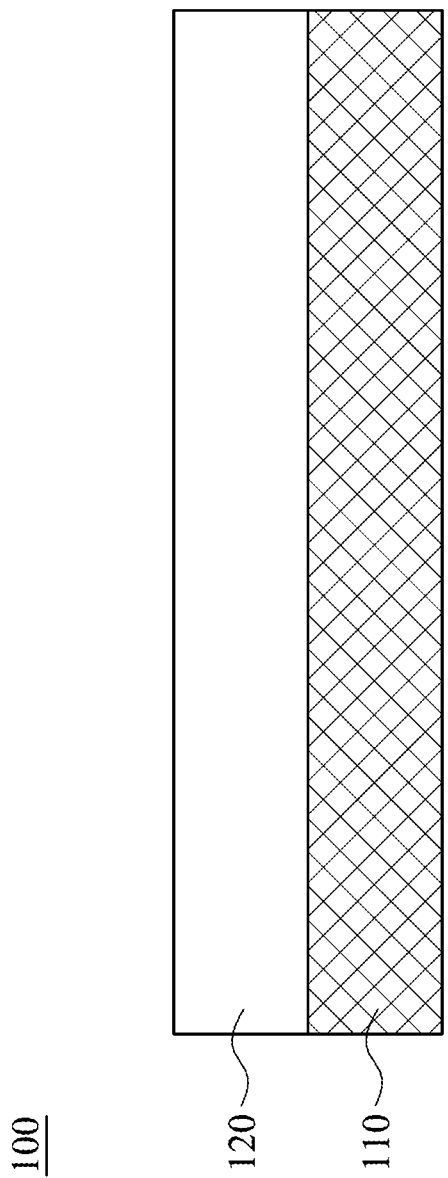

LIQUID CRYSTAL POLYMER COMPOSITE AND HIGH-FREQUENCY COMPOSITE SUBSTRATE

CROSS-REFERENCE TO RELATED APPLICATION

This application claims priority to Taiwan Application Serial Number 106131631, filed Sep. 14, 2017, which is herein incorporated by reference.

BACKGROUND

Field of Invention

The present invention relates to a liquid crystal polymer composite and a high-frequency composite substrate.

Description of Related Art

Robust and high-speed signal transmission plays an important role to fulfill the market demand for multi-purpose 3C mobile communication products. In addition, a smaller and more compact structure is required for a flexible printed circuit (FPC). The working frequencies of electronic communication products, such as smartphones and tablet computers, are higher and broader in recent years and span from low frequency (several MHz) to high frequency (GHz) between various wireless communication module elements, in the aspect of functionality. Therefore, in order to meet the requirements of high-frequency circuits, the adverse effect arising from RC delay of existing mobile devices has to be reduced.

In general, a liquid crystal polymer film used in a high-frequency substrate is formed of liquid crystal polymer particles molded by hot melt extrusion molding, inflation molding or blow molding. In the molten liquid crystal polymers, a molecular chain orientation arises due to the liquid crystallinity, which has a shear flow and an extensional flow. The molecular chain orientation may influence the mechanical properties of the liquid crystal polymer film, and therefore the mechanical properties of the liquid crystal polymer film may vary depending on the formation conditions of the molecular chain orientation in the liquid crystal polymer film. Namely, the mechanical properties of the liquid crystal polymer film are influenced by either of the following: (1) the condition under which the molecular chain orientation is formed by the flow during a molding process; (2) the condition for maintaining the molecular chain orientation during a cooling and solidification process. The mechanical properties of a conventional aromatic liquid crystalline polyester film formed by extrusion molding are inferior in the transverse direction (TD) to those in the machine direction (MD). In other words, the mechanical properties of the conventional aromatic liquid crystalline polyester film are highly anisotropic. Specifically, the process of forming the conventional aromatic liquid crystalline polyester film requires control over various environmental parameters to adjust the liquid crystal molecular chain alignment for achieving better mechanical properties. The complexity of the manufacturing process is thereby increased. In addition, the strength of a laminate decreases along with shrinking thickness of the laminate, thereby the warping issue of the laminate is aggravated.

SUMMARY

One aspect of the present invention is to provide a liquid crystal polymer composite. The liquid crystal polymer composite includes a solvent, a soluble liquid crystal polymer, and an additive. The soluble liquid crystal polymer is dissolved in the solvent. The additive includes at least one organic polymer or inorganic filler and is dispersed or dissolved in the solvent.

According to one or more embodiments of the present invention, the additive is an organic polymer. The organic polymer is selected from the group consisting of polyester liquid crystal polymer, aromatic polyester, aromatic polyamine, poly(paraphenylene terephthalamide), poly(paraphenylene benzobisoxazole), and a copolymer of p-hydroxybenzoic acid and 6-hydroxy-2-naphthalene acid.

According to one or more embodiments of the present invention, the soluble liquid crystal polymer has a liquid crystal polymer and an aromatic polymer. The liquid crystal polymer includes a repeating unit. The repeating unit has the following structure:

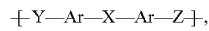

in which Ar is 1,4-phenylene, 1,3-phenylene, 2,6-naphthalene, or 4,4'-biphenylene, Y is O or NH, Z is C=O, X is amino, carboxamido, imino, amidino, aminocarbonylamino, aminothiocarbonyl, aminocarbonyloxy, aminosulfonyl, aminosulfonyloxy, aminosulfonylamino, carboxyl ester, (carboxyl ester)amino, (alkoxycarbonyl)oxy, alkoxycarbonyl, hydroxyamino, alkoxyamino, cyanato, isocyanato, or combinations thereof.

According to one or more embodiments of the present invention, the organic polymer is not dissolved in the solvent, and the organic polymer has an average particle size of 0.1 μm to 20 μm.

According to one or more embodiments of the present invention, the additive is the inorganic filler. The inorganic filler is selected from the group consisting of BN, $Al_2O_3$, AlN, $TiO_2$, $SiO_2$, and combinations thereof.

According to one or more embodiments of the present invention, the inorganic filler has an average particle size of 0.1 μm to 20 μm.

According to one or more embodiments of the present invention, the additive is 1~300 parts by weight based on 100 parts by weight of the soluble liquid crystal polymer.

According to one or more embodiments of the present invention, the solvent is selected from the group consisting of N-methyl-2-pyrrolidone (NMP), dimethylacetamide (DMAC), gamma-butyrolactone (GBL), dimethylformamide (DMF), 2-butoxyethanol, and 2-ethoxyethanol.

One aspect of the present invention is to provide a high-frequency composite substrate having a metal layer and a liquid crystal polymer composite layer. The liquid crystal polymer composite layer is made of the liquid crystal polymer composite of any embodiment of the foregoing description.

According to one or more embodiments of the present invention, the metal layer includes copper, aluminum, iron, silver, palladium, nickel, chromium, molybdenum, tungsten, zinc, chromium, manganese, cobalt, gold, tin, lead, stainless steel, or alloys thereof.

BRIEF DESCRIPTION OF THE DRAWINGS

The invention can be more fully understood by reading the following detailed description of the embodiment, with reference made to the accompanying drawings as follows:

FIG. 1 illustrates a laminate according to some embodiments of the present invention.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

As used herein, the singular forms "a," "an" and "the" include plural referents unless the context clearly dictates otherwise. Such specific reference via "one embodiment", in which case at least one embodiment of the invention, shows a particular feature, structure, or characteristic, so throughout the "in one embodiment", so through phrase appears, not necessary to refer to the same embodiment. Further, in one or more embodiments, these particular features, structures, or characteristics can be combined by any appropriate way.

FIG. 1 illustrates a laminate 100 having a metal layer 110 and a liquid crystal polymer composite layer 120. The laminate 100 may be adequate for high-frequency and high-speed transmission needs. For instance, the laminate 100 is a high-frequency composite substrate. The liquid crystal polymer composite layer 120 is disposed on the metal layer 110. In some embodiments, the liquid crystal polymer composite layer 120 is in direct contact with the metal layer 110. In some examples, the metal layer 110 includes copper, aluminum, iron, silver, palladium, nickel, chromium, molybdenum, tungsten, zinc, chromium, manganese, cobalt, gold, tin, lead, stainless steel, or an alloy layer thereof. In some examples, a roughness of a contact surface between the metal layer 110 and the liquid crystal polymer composite layer 120 ranges from 0.2 µm to about 5 µm, for example, 0.5 µm, 1 µm, 2 µm, or 4 µm. In other examples, the metal layer 110 is a copper foil, such as an electrodeposited copper foil or a rolled copper foil.

The laminate 100 may be flexible or rigid. For example, a flexible laminate 100 is a flexible copper clad laminate (FCCL). The flexible laminate 100 may be utilized to manufacture a flexible circuit board (FCB), which is pliable. In another example, a rigid laminate 100 is a copper clad laminate (CCL). The rigid laminate 100 may be utilized to manufacture a rigid circuit board. The rigid circuit board may be a printed circuit board (PCB).

In some examples of the present invention, the laminate 100 further includes an adhesive layer (not shown) disposed between the metal layer 110 and the liquid crystal polymer composite layer 120. The adhesive layer is used to bond the metal layer 110 and the liquid crystal polymer composite layer 120 together. The adhesive layer may be made of epoxy resin, phenoxy resin, acrylic resin, ethyl carbamate resin, polymerized siloxanes, poly-p-xylene resin, liquid crystal polymer, bismaleimide resin, polyimide resin, or combinations thereof. It is noted that the adhesive layer may be omitted in other examples of the present invention. That is, the liquid crystal polymer composite layer 120 may be in direct contact with the metal layer 110.

In some examples of the present invention, the liquid crystal polymer composite layer 120 is made of liquid crystal polymer (LCP) composite or other suitable materials. Since the liquid crystal polymer has a densely aligned linear polymer structure, thus the products that are made of the liquid crystal polymer composite may possess excellent mechanical properties. Additionally, the products that are made of the liquid crystal polymer composite may have high strength or high heat resistance by further processing, and therefore are adequate to serve as a heat-resistant electronic material or a substrate of high-performance engineering plastics.

In some examples, the liquid crystal polymer composite layer 120 is formed separately. Namely, the liquid crystal polymer composite layer 120 is not necessary formed on the metal layer 110. The liquid crystal polymer composite layer 120 may be a dielectric layer or an insulating layer and is formed directly. In other words, the laminate 100 may be formed without the metal layer 110 and the adhesive layer (not shown). Thus, the liquid crystal polymer composite layer 120 is not limited to be formed in direct contact with the metal layer 110.

Since the liquid crystal polymer is prone to alignment and forming a molecular-level barrier, therefore the liquid crystal polymer has low water absorbability and high gas barrier properties. Compared with common polyimide (PI) film material, the film that is made of the liquid crystal polymer has lower water absorbability, lower dielectric constant, lower thermal expansion coefficient (CTE), higher dimensional stability, higher gas barrier properties, and higher thermal conductivity. In particular, the film that is made of the liquid crystal polymer has an extremely small linear thermal expansion coefficient in the flow direction. The linear thermal expansion coefficient of the film is one magnitude order lower than common plastics and is close to the thermal expansion coefficient of metal. The liquid crystal polymer is recyclable. In addition, the film that is made of the liquid crystal polymer is cost-effective as well, as it can be bonded to the metal layer by thermal bonding process without using any adhesive, such as epoxy resin adhesive. Moreover, some drawbacks may be avoided as no adhesive is required. The drawbacks include insufficient glass transition temperature ($T_g$) and hardened adhesive resulted from remaining adhesive, for example.

Since the liquid crystal polymer composite layer 120 has the liquid crystal polymer with a low dielectric constant such as between 2 and 4, the capacitance generated by the laminate 100 or a circuit board that is made by the laminate 100 may be reduced. The capacitance is a parasitic capacitance, for example. In this way, the adverse effect arising from RC delay may be reduced to meet the requirements of high-frequency circuits. In addition, the content of chlorine (Cl), lithium (Li), and sodium (Na) in the liquid crystal polymer composite layer 120 that is made of the liquid crystal polymer is less than 1 ppm. Therefore, the liquid crystal polymer has high purity and is adequate for precise electronic products.

In general, hot melt extrusion molding, inflation molding or blow molding of the liquid crystal polymer particles are commonly used in a fabrication process of the liquid crystal polymer. As mentioned above, such fabrication process requires control over various parameters to tune the liquid crystal molecule alignment. Thus the complexity of the fabrication process is increased.

Some studies on liquid crystal polymer modification were conducted to address the abovementioned disadvantages of thermotropic liquid crystal polymer. A modified liquid crystal polymer soluble in organic solvent was obtained. A coating process using a solution containing the modified liquid crystal polymer was further performed to form a liquid crystal polymer layer. In this way, the complexity of the fabrication process is reduced. However, the thermal expansion coefficient is still high. The high thermal expansion coefficient is resulted from the alteration of the polymer alignments in the modified liquid crystal polymer and the difference between the fabrication processes. If a material with a high thermal expansion coefficient is adopted in a liquid crystal polymer composite layer, then the stability of a laminate that is made of the liquid crystal polymer composite layer may be influenced. For example, the laminate may encounter warping issue.

The liquid crystal polymer composite provided by the present invention may solve the foregoing issue concerning the higher thermal expansion coefficient. In some examples of the present invention, the liquid crystal polymer composite layer 120 is made of the liquid crystal polymer composite. The liquid crystal polymer composite includes a solvent, a soluble liquid crystal polymer, and an additive.

In some examples, the modified liquid crystal polymer is a soluble liquid crystal polymer that is soluble in a solvent. The solvent is N-methyl-2-pyrrolidone (NMP), dimethylacetamide (DMAC), gamma-butyrolactone (GBL), dimethylformamide (DMF), 2-butoxyethanol, or 2-ethoxyethanol, for example.

In some embodiments, the soluble liquid crystal polymer includes a liquid crystal polymer and an aromatic polymer. The aromatic polymer is selected from one or more of the following: aromatic polyester, aromatic polyamide, polyphenylene terephthalamide (PPTA), poly(p-phenylene-2,6-benzobisoxazole (PBC)), and poly(p-hydroxybenzoic acid-co-2-hydroxy-6-naphthoic acid).

In some examples, the liquid crystal polymer in the soluble liquid crystal polymer has a repeating unit. The repeating unit has the following structure:

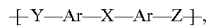

in which Ar is 1,4-phenylene, 1,3-phenylene, 2,6-naphthalene, or 4,4'-biphenylene, Y is O or NH, Z is C=O, while X is amino, carboxamido group, imino, amidino, aminocarbonylamino, aminothiocarbonyl, aminocarbonyloxy, aminosulfonyl, aminosulfonyloxy, aminosulfonylamino, carboxyl ester, (carboxyl ester)amino, (alkoxycarbonyl)oxy, alkoxycarbonyl, hydroxyamino, alkoxyamino, cyanato, isocyanato, or combinations thereof, but not limited thereto. Compared with common liquid crystal polymer, the soluble liquid crystal polymer has a higher solubility in the above-mentioned solvents.

The liquid crystal polymer composite layer 120 that is made of the liquid crystal polymer composite having the liquid crystal polymer or the soluble liquid crystal polymer may serve as a substrate of a flexible printed circuit (FPC), an inter-poser in a tape ball grid array (TBGA) and a chip scale package (CSP), a multi-layer substrate with high density packaging, a high-frequency composite substrate, an insulating film or insulating tape in IC packaging, a carrier-film or adhesive-film in tape automated bonding (TAB), and heat-resistant engineering plastics.

The additive in the liquid crystal polymer composite is an organic polymer, inorganic filler, or combinations thereof, for example.

In some examples of the present invention, the additive is inorganic filler. The inorganic filler includes BN, $Al_2O_3$, AlN, $TiO_2$, $SiO_2$, or combinations thereof. The inorganic filler may reduce the thermal expansion coefficient of the liquid crystal polymer composite layer 120 that is made of the soluble liquid crystal polymer. Hence the liquid crystal polymer composite layer 120 may have a thermal expansion coefficient close to that of metal. Accordingly, the warping issue of the laminate is prevented. The liquid crystal polymer composite with added inorganic filler may be utilized in the manufacturing of a printed circuit and the like. In some examples where the additive is the inorganic filler, the particles of the inorganic filler have to be completely dispersed in the solvent for better performance, as the inorganic filler itself is not readily soluble in the solvent. In some examples, an average particle size of the inorganic filler is selected to be about 20% to about 40% of the thickness of the liquid crystal polymer composite layer 120, such as 25%, 30%, or 35%. In some examples, the particle size of the inorganic filler is about 0.1 μm to about 20 μm, such as 0.5 μm, 1 μm, 2 μm, 5 μm, 10 μm or 15 μm.

In some examples of the present invention, the additive of the liquid crystal polymer composite is an organic polymer. The organic polymer may be such as polyester liquid crystal polymer, aromatic polyester, aromatic polyamine, poly(paraphenylene terephthalamide), poly(paraphenylene benzobisoxazole), a copolymer of p-hydroxybenzoic acid and 6-hydroxy-2-naphthalene acid, or combinations thereof. In some examples, the organic polymer is soluble in the solvent of the liquid crystal polymer composite. In yet other examples, the organic polymer is not soluble in the solvent of the liquid crystal polymer composite. By adding the organic polymer into the liquid crystal polymer composite, the thermal expansion coefficient of the liquid crystal polymer composite layer 120 that is made of the soluble liquid crystal polymer may be reduced, thereby the issue of the higher thermal expansion coefficient is solved. Hence the liquid crystal polymer composite layer 120 may have a thermal expansion coefficient close to that of metal. Accordingly, the warping issue of the laminate is prevented. In some examples, the organic polymer is not soluble in the solvent of the liquid crystal polymer composite. The average particle size of the organic polymer may be selected to be about 20% to about 40% of the thickness of the liquid crystal polymer composite layer 120, such as 25%, 30%, or 35%. In some examples, the particle size of the organic polymer is about 0.1 μm to about 20 μm, such as 0.5 μm, 1 μm, 2 μm, 5 μm, 10 μm, or 15 μm.

The thermal expansion coefficient of the liquid crystal polymer composite layer 120 that is made of the liquid crystal polymer composite may be reduced by adding the organic polymer into the liquid crystal polymer composite to prevent warping of the laminate. If the temperature reaches the melting point of the organic polymer, the orientation of the soluble liquid crystal polymer may be altered by the molten organic polymer, and thereby the thermal expansion coefficient of the modified liquid crystal polymer may be reduced to a lower value. Additionally, some organic polymers have lower thermal expansion coefficients. Thus the thermal expansion coefficient of the liquid crystal polymer composite having the added organic polymer may be reduced. In some examples, the organic polymer is the liquid crystal polymer.

In some examples where the additive is the organic polymer, the liquid crystal polymer composite layer 120 that is made of the liquid crystal polymer composite is adequate for printed circuit board and flexible copper clad laminate.

In some examples of the present invention, the additive includes two or more inorganic fillers or two or more organic polymers. In some examples, the additive includes a combination of the inorganic filler and the organic polymer. The abovementioned additive may reduce the thermal expansion coefficient of the liquid crystal polymer composite layer 120 that is made of the liquid crystal polymer composite. Suitable combinations of additives may be selected to meet actual needs, and therefore are not repeated herein.

If the added amount of the additive is too low, such as the added amount of the additive is less than 0.5 parts by weight based on 100 parts by weight of soluble liquid crystal polymer, there may be no significant improvement on thermal expansion coefficient. However, if the added amount of the additive is too high, such as the added amount of the additive is greater than 300 parts by weight based on 100 parts by weight of soluble liquid crystal polymer, then the properties of the formed liquid crystal polymer composite layer may vary greatly. These properties include water absorbability, dielectric constant, gas barrier properties and the like, for instance. Therefore, the advantageous of preparing the liquid crystal polymer composite layer of the laminate by using the liquid crystal polymer may not be obtained. In some examples of the present invention, the added amount of the additive is about 1 to about 300 parts by weight based on 100 parts by weight of the soluble liquid crystal polymer, such as 5, 10, 25, 50, 100, 150, 200 or 250 parts by weight.

In some examples of the present invention, the liquid crystal polymer composite layer 120 is formed by a precision coating process or a pre-casting process, in which the liquid crystal polymer composite undergoes a high-temperature cyclization on the surface of the metal layer 110. The liquid crystal polymer composite layer 120 and the metal layer 110, taken together, form a single-sided liquid crystal polymer-metal laminate. The temperature of the high-temperature cyclization is about 200° C. to about 400° C., such as 250° C., 300° C. or 350° C. The duration of the high-temperature cyclization is about 10 minutes to about 300 minutes, such as 20 minutes, 50 minutes, 100 minutes, 150 minutes, 200 minutes or 250 minutes.

The technical solution of the present disclosure may reduce the thermal expansion coefficient of the liquid crystal polymer composite layer 120 that is formed of the liquid crystal polymer composite. To be more precise, the thermal expansion coefficient of the liquid crystal polymer composite layer 120 may drop to about 12 ppm to 25 ppm in a temperature range of 100° C. to 200° C. On the other hand, the thermal expansion coefficient of the liquid crystal polymer composite layer 120 that is not treated with the technical solution of the present disclosure is about 28 ppm to 50 ppm. It can be seen that the technical solution of the present disclosure may reduce the thermal expansion coefficient of the liquid crystal polymer composite layer 120 effectively, and the range of the thermal expansion coefficient is close to that of metal. Since the thermal expansion coefficients of the liquid crystal polymer composite layer 120 and the metal layer 110 are close to each other, therefore the laminate is less susceptible to some disadvantages, such as warping issue. Therefore, the service life of the laminate can be longer, and the application of the laminate can be broader. In addition, the liquid crystal polymer composite provided in the present disclosure may be used as a material for pre-cast molding.

Furthermore, various laminates described in the present disclosure may be combined to form a thick laminate without departing from the spirit of the present disclosure. For example, the thick laminate includes two or more liquid crystal polymer composite layers 120, but not limited thereto. The number, the material, and the thickness of a single layer may vary arbitrarily to conform to various design requirements. This is to match the metal wire design on the surface of the liquid crystal polymer composite layer 120 and to achieve the optimal loading capacity of a high voltage or a high current.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A liquid crystal polymer composite, comprising:
   a solvent selected from the group consisting of N-methyl-2-pyrrolidone (NMP), dimethylacetamide (DMAC), gamma-butyrolactone (GBL), dimethylformamide (DMF), 2-butoxyethanol, and 2-ethoxyethanol;
   a soluble liquid crystal polymer dissolved in the solvent, wherein the soluble liquid crystal polymer comprises a liquid crystal polymer and an aromatic polymer, the liquid crystal polymer having a repeating unit of the following structure:

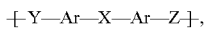

wherein Ar is 1,4-phenylene, 1,3-phenylene, 2,6-naphthalene or 4,4'-biphenylene, Y is O or NH, Z is C=O, and X is amino, imino, amidino, aminocarbonylamino, aminothiocarbonyl, aminocarbonyloxy, aminosulfonyl, aminosulfonyloxy, aminosulfonylamino, (carboxyl ester)amino, (alkoxycarbonyl)oxy), hydroxyamino, alkoxyamino, cyanato, isocyanato, or combinations thereof; and
   an additive having at least one organic polymer or at least one inorganic filler, while the additive is dispersed or dissolved in the solvent.

2. The liquid crystal polymer composite of claim 1, wherein the additive is the organic polymer, and the organic polymer is selected from the group consisting of polyester liquid crystal polymer, aromatic polyester, aromatic polyamine, poly paraphenylene terephthalamide, polyparaphenylene benzobisoxazole, and a copolymer of p-hydroxybenzoic acid and 6-hydroxy-2-naphthalene acid.

3. The liquid crystal polymer composite of claim 2, wherein the organic polymer is not dissolved in the solvent and having an average particle size of 0.1 μm to 20 μm.

4. The liquid crystal polymer composite of claim 1, wherein the additive is the inorganic filler, and the inorganic filler is selected from the group consisting of BN, $Al_2O_3$, AlN, $TiO_2$, $SiO_2$, and combinations thereof.

5. The liquid crystal polymer composite of claim 4, wherein the inorganic filler has an average particle size of 0.1 μm to 20 μm.

6. The liquid crystal polymer composite of claim 1, wherein the additive is 1-300 parts by weight based on 100 parts by weight of the soluble liquid crystal polymer.

7. A high-frequency composite substrate, comprising:
   a metal layer; and
   a liquid crystal polymer composite layer made of the liquid crystal polymer composite of claim 1.

8. The high-frequency composite substrate of claim 7, wherein the metal layer comprises copper, aluminum, iron, silver, palladium, nickel, chromium, molybdenum, tungsten, zinc, chromium, manganese, cobalt, gold, tin, lead, stainless steel, or alloys thereof.

* * * * *